(12) United States Patent
Mueller et al.

(10) Patent No.: US 12,202,338 B2
(45) Date of Patent: Jan. 21, 2025

(54) DISPLAY DEVICE WITH TRANSPARENT SCREEN ELEMENT, MOTOR VEHICLE WITH DISPLAY DEVICE

(71) Applicant: AUDI AG, Ingolstadt (DE)

(72) Inventors: Ulrich Mueller, Ingolstadt (DE); Jacques Helot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 247 days.

(21) Appl. No.: 17/789,316

(22) PCT Filed: Dec. 18, 2020

(86) PCT No.: PCT/EP2020/086988
§ 371 (c)(1),
(2) Date: Jun. 27, 2022

(87) PCT Pub. No.: WO2021/136687
PCT Pub. Date: Jul. 8, 2021

(65) Prior Publication Data
US 2023/0034855 A1    Feb. 2, 2023

(30) Foreign Application Priority Data

Jan. 3, 2020   (DE) .................... 10 2020 100 055.3

(51) Int. Cl.
*B60K 35/00* (2024.01)
*B60K 35/60* (2024.01)
*B60K 35/40* (2024.01)

(52) U.S. Cl.
CPC ............ *B60K 35/00* (2013.01); *B60K 35/415* (2024.01); *B60K 35/425* (2024.01); *B60K 35/60* (2024.01);
(Continued)

(58) Field of Classification Search
CPC .... B60K 35/00; B60K 35/415; B60K 35/425; B60K 35/60; B60K 2360/25;
(Continued)

(56) References Cited

U.S. PATENT DOCUMENTS 4,709,991 A * 12/1987 Hoshikawa ........... G02F 1/1333
349/122
5,965,981 A   10/1999 Inoguchi et al.
(Continued)

FOREIGN PATENT DOCUMENTS

CN         101311804 B     9/2010
DE         19737942 A1     3/1999
(Continued)

OTHER PUBLICATIONS

International Search Report (Form PCT/ISA/210); mailed Apr. 9, 2021 in corresponding PCT Application No. PCT/EP2020/086988 (6 pages) (2 pages English Translation).
(Continued)

*Primary Examiner* — Rodney A Butler
(74) *Attorney, Agent, or Firm* — STAAS & HALSEY LLP

(57) ABSTRACT

A display device includes a transparent display screen element, which has a front side and a rear side opposite to the front side, and a polarizing element arranged flatly on the rear side of the transparent display screen element. The polarizing element is to attenuate light output by at least one lighting element of the transparent display screen element. A motor vehicle may have such a display device, in particular where the display device may be arranged freestanding at or on an interior trim element of the motor vehicle.

20 Claims, 3 Drawing Sheets

(52) U.S. Cl.
CPC .... *B60K 2360/25* (2024.01); *B60K 2360/332* (2024.01); *B60K 2360/785* (2024.01)

(58) Field of Classification Search
CPC ........ B60K 2360/332; B60K 2360/785; B60K 2360/1523; B60K 2360/343; B60K 35/22
See application file for complete search history.

(56) References Cited

U.S. PATENT DOCUMENTS

| | | | |
|---|---|---|---|
| 9,915,974 B2* | 3/2018 | Yang | G06F 1/1616 |
| 2002/0118320 A1* | 8/2002 | Bayrle | G02F 1/133351 |
| | | | 349/73 |
| 2008/0238828 A1 | 10/2008 | Nakayama et al. | |
| 2010/0177025 A1 | 7/2010 | Nagata et al. | |
| 2014/0293417 A1* | 10/2014 | Sato | G02C 1/04 |
| | | | 359/465 |
| 2015/0109666 A1* | 4/2015 | Wei | G02B 30/25 |
| | | | 359/462 |
| 2016/0091726 A1* | 3/2016 | Yoon | H04N 13/305 |
| | | | 349/86 |
| 2016/0154269 A1 | 6/2016 | Fukuoka et al. | |
| 2018/0015810 A1 | 1/2018 | Chelian | |
| 2018/0157036 A1 | 6/2018 | Choi et al. | |
| 2020/0124921 A1* | 4/2020 | Hai | G02F 1/133634 |

FOREIGN PATENT DOCUMENTS

| | | |
|---|---|---|
| DE | 102 38 531 A1 | 3/2004 |
| DE | 10 2014 014 412 A1 | 3/2016 |
| DE | 10 2017 214 952 B3 | 2/2019 |
| DE | 10 2020 100 055.3 | 1/2020 |
| WO | PCT/EP2020/086988 | 12/2020 |

OTHER PUBLICATIONS

Written Opinion (Form PCT/ISA/237); mailed Apr. 9, 2021 in corresponding PCT Application No. PCT/EP2020/086988 (5 pages) (5 pages English Translation).
Examination Report dated Oct. 23, 2020 in corresponding German Patent Application No. 10 2020 100 055.3 (8 pages).

* cited by examiner

DISPLAY DEVICE WITH TRANSPARENT SCREEN ELEMENT, MOTOR VEHICLE WITH DISPLAY DEVICE

CROSS-REFERENCE TO RELATED APPLICATIONS

This application is a U.S. national stage of International Application No. PCT/EP2020/086988, filed on Dec. 18, 2020. The International Application claims the priority benefit of German Application No. 10 2020 100055.3 filed on Jan. 3, 2020. Both the International Application and the German Application are incorporated by reference herein in their entirety.

FIELD

The described examples relate to a display device having a transparent display screen element, thus having a component or a transparent component group which may be configured to display a display content on a transparent display surface. The transparent display screen element can be a transparent display screen having organic light-emitting diodes ("transparent organic light-emitting diodes" (TOLED)).

BACKGROUND

Modern motor vehicles can be equipped with displays which are arranged freestanding, for example, on a control panel. Transparent displays emit light in two directions, i.e., for example, toward the driver and toward the windshield. The displayed content is, when the display is switched to "transparent", visible both on the front side of the display (toward the driver) and also on the rear side (toward the windshield). The content is therefore visible mirror-reversed from outside the vehicle.

DE 102 38 531 A1 describes a display device having a display plate having active optical elements for image generation, which is arranged in the vehicle in such a way that the driver can observe the road or operating elements in the vehicle through the display.

A motor vehicle is known from DE 10 2014 014 412 A1, which has pixel elements operable in a self-luminous manner, and having a control unit which is designed to display a graphical user interface on the touch screen by means of the pixel elements in a first operating mode and to control at least one device of the motor vehicle different from the operating device by a control signal in dependence on a touch signal of the touch screen.

DE 10 2017 214 952 B2 describes a display device, a method for producing a display device, a device, a method, and a computer-readable storage medium having instructions for activating a display device.

The display content of such displays is visible from outside the vehicle through the windshield, because of which privacy is not provided. This is undesirable in particular upon the display of private and personal items of information. Furthermore, other vehicles or passersby can be irritated if the display screen also emits light forward through the windshield.

SUMMARY

Described below is a way of improving privacy when displaying display contents in the motor vehicle.

Described examples are is based on the concept of combining a transparent display screen element with a polarizing element. A polarizing element is understood here as a component or a component group which is configured to attenuate or even block light that is actively emitted by the display screen element. The polarizing element can be, for example, a masking element, thus a plate or film for masking light, for example, circularly polarized light or linearly polarized light. The polarizing element can therefore also be referred to as a display screen light dimming element or as a display screen light filter element.

In other words, the polarizing element may be provided for the display screen element for the purpose of acting or functioning like a polarizer in the state of the display surface transparent to ambient light and filtering away the light of the display screen element. For this purpose, for example, the polarizing element can be configured as a polarizer and/or can have chemical structures which attenuate light. In particular, the polarizing element can filter away the light of the display screen element due to the structure and/or composition of the polarizing element in combination with a structure and/or composition of the display screen element. In other words, the polarizing element can be adapted to the composition of the display screen element. Since the ambient light at least partially still passes through the combination of polarizing element and display screen element, the polarizing element can also be referred to as a transparent polarizing element which may include a partially transparent polarizing element.

A high degree of privacy is thus provided to an occupant in the motor vehicle. In addition, other vehicles and passersby are dazzled less or not at all and are irritated less or not at all by a displayed content.

The display device includes a transparent display screen element, which has a front side and a rear side opposite to the front side. A display device is a device, a device group, or a device component which is to display contents, for example, graphical user interfaces ("GUI"). The display screen element is for the purpose of displaying the content (or multiple contents) with the aid of a totality of lighting elements, for example, organic light-emitting diodes ("OLEDs").

The display device additionally may include a polarizing element arranged flatly on the rear side of the transparent display screen element, which is for the purpose of attenuating, reducing, or even blocking light actively emitted by at least one lighting element of the transparent display screen element. The attenuation or blocking of the light of the lighting elements can be carried out by a polarizing structure of the polarizing element, for example, a grating structure. In other words, the transparent polarizing element is for the purpose of attenuating, reducing, or blocking the light of, for example, light-emitting diodes of the transparent display screen element, but remains transparent to ambient light of the transparent display screen element. A user can thus see through from both sides of the display device or from both sides of the transparent display screen element, but can only see the display content when looking at the front side. The above-mentioned advantages may result.

The display screen element of the display device can be a so-called TOLED display (transparent organic light-emitting diode display), thus as a display screen having transparent organic light-emitting diodes.

If the polarizing element has a grating structure, the effect is additionally supported. The effect is supported particularly strongly if the display device additionally has a planar reflection protection element, thus a planar component to suppress a reflection of the ambient light of the display screen element. The reflection protection element can also be referred to as a reflection suppression element. The reflection protection element can include, for example, a polarization filter, which is for the linear polarization of light, wherein a polarization structure of the polarization element is oriented toward the grating direction of the grating structure. The polarization structure can extend at a determined angle in relation to the grating structure, preferably at an angle of less than 180°, in particular normally or perpendicularly. The grating structure can also be referred to as an antiparallel grating structure.

The optional reflection protection element can be arranged on the front side of the transparent display screen element, so that ambient light incident in the transparent display screen element is polarized. The reflection protection element is, in other words, not part of the polarizing element. A reflection protection element can be arranged in each case on the front side of the display screen element and on the rear side of the display screen element, thus between display screen element and polarizing element. The effect is particularly strong if the respective reflection protection element has a polarization filter element, thus a polarization filter, and a delay element. A delay element is understood as a plate or film which delays light waves, in particular a quarter-wave plate or quarter-wave film.

The ambient light may be polarized and delayed before the display screen element by the combination of polarization filter element and delay element, so that circularly polarized ambient light is incident on the display screen element and—at least a component of this ambient light—passes through the display screen element where the ambient light is "decircularized" again by the rear reflection protection element and is incident on the polarizing element. The light actively emitted by the display screen element, for example, by light-emitting diodes, only goes through one reflection protection element. If the example light-emitting diodes emit normal, non-polarized light, due to the rear reflection protection element, this becomes circularly polarized light which is incident on the polarizing element. The polarizing elements for blocking the light of the lighting elements—and for transmitting the ambient light—are in this case then at least one vertical alignment display element and/or at least one twisted nematic display element. In an example, one vertical alignment display element or one twisted nematic display element may be provided. The display element can then optionally have, for example, a polarization filter element, or can block the light of the lighting elements by chemical structures and/or grating structures.

The effect in which a displayed content is only visible in one direction although a display surface still appears transparent is particularly strong if the transparent polarizing element, according to an example of the display device, is as a vertical alignment display element, for example, as a vertical alignment display screen, or optionally has at least two vertical alignment display elements. The vertical alignment display element can optionally be a film or plate. Vertical alignment technologies, for example, multi-domain vertical alignment (MVA) and patterned vertical alignment (PVA), are examples of liquid crystal displays known to a person skilled in the art.

This strong effect is also to be observed in a display device in which the transparent polarizing element is as a twisted nematic display element, thus as a liquid crystal display having nematic rotating cells, or optionally has two or more twisted nematic display elements. The twisted nematic display element can be one, for example. The at least one twisted nematic display element can optionally be a film or plate.

In a further example, the transparent polarizing element of the display device can have a twisted nematic display element and a vertical alignment display element. In other words, the transparent polarizing element can be a combination of a twisted nematic display element and a vertical alignment display element.

According to a further example of the display device, the display screen element can be for the purpose of outputting only non-polarized light by the at least one lighting element. In other words, the display screen element can be for the purpose of outputting only non-polarized light by an entirety of lighting elements. A refinement can be used in combination with a polarizing element, which has a grating structure, wherein at least one reflection suppression element can additionally be arranged on the display screen element. One reflection protection element can be arranged in each case on the front side of the display screen element and on the rear side of the display screen element, thus between display screen element and polarizing element. The effect is particularly strong if the respective reflection protection element has a polarization filter element, and a delay element, in particular a quarter-wave plate or quarter-wave film. The polarizing elements are in this case at least one vertical alignment display element and/or at least one twisted nematic display element. In an example, one vertical alignment display element or one twisted nematic display element may be provided.

If the display screen element only has lighting elements which emit polarized light, the polarizing element can be arranged in such a way that the polarized light of the lighting elements, for example, of light-emitting diodes, is blocked, but not the ambient light which passes through the display screen element. In this example, the polarizing element can have a polar filter element, for example, can be a polar filter. In this example, the polarizing element also manages without twisted nematic display element or vertical alignment display element.

If the polarizing element is designed as polarization filter-free, the polarizing element thus does not have a polarization filter, the display surface of the display device may not be additionally darkened.

The described examples may be applied to a motor vehicle which has a display device according to one of the above-described examples. The above-described advantages may result.

The display device can be at least a part of a windowpane, which may include a windshield, of the motor vehicle. Particularly many private messages for the user in the interior can be displayed due to the size of the surface of the windowpane. The disadvantage of a design of the display device as a windshield may be that the windshield is often struck by falling rocks and it is probable that it will have to be replaced. A design as a windshield is additionally more complex since the windshield is curved and inclined. These disadvantages can be bypassed if the display device is arranged freestanding at or on an interior trim element of the motor vehicle, wherein the front side faces toward the interior of the motor vehicle, and wherein the rear side faces toward a motor vehicle windowpane, for example the windshield.

The described examples also include refinements of the motor vehicle according to the examples, which have features as have already been described in conjunction with the refinements of the display device according to the examples.

For this reason, the corresponding refinements of the motor vehicle according to the examples are not described once again here.

The motor vehicle according to the examples may be an automobile, in particular as a passenger vehicle or truck, or as a bus or motorcycle.

DESCRIPTION

In the inventive examples of embodiments, the described components of the examples each represent individual features, which are to be considered independently of one another and developed independently of one another. The disclosure is therefore also to include other combinations of the features of the inventive examples of embodiments than those shown. Furthermore, the described examples can also be supplemented by further features already described.

In the figures, identical reference signs each identify functionally identical elements.

Figure 1:
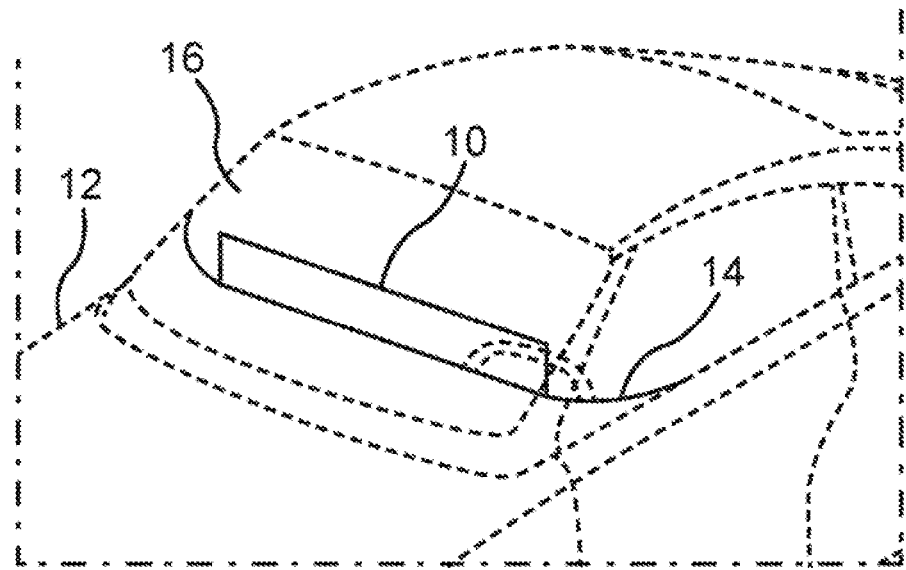
FIG. 1 is a schematic three-dimensional representation of a motor vehicle according to an example having a display device according to an example, in a view from the outside of the motor vehicle.

FIG. 1 illustrates the principle of the display device 10 according to an example, which is shown arranged in a motor vehicle 12 by way of example in FIG. 1. The motor vehicle 12 can be, for example, a passenger vehicle, and the display device 10 can be, for example, a freestanding display screen, which can be arranged on an interior trim element 14 of the motor vehicle 12, for example on a control panel. From the three-dimensional perspective of FIG. 1, a rear side of the display device 10 can be seen, which faces towards a windowpane 16 of the motor vehicle 12, for example a windshield.

Alternatively, in an example, a freestanding display screen may be provided in the motor vehicle 12, and the display device 10 can also be as at least a part of a windowpane 16 of the motor vehicle 12, for example, as a windshield or side window.

FIG. 1 shows the display device 10, which outputs a displayed content, for example, a graphical user interface (GUI). The view directed in FIG. 1 from the outside of the motor vehicle into the motor vehicle 12 shows that from the outside the displayed content cannot be seen.

Figure 2:
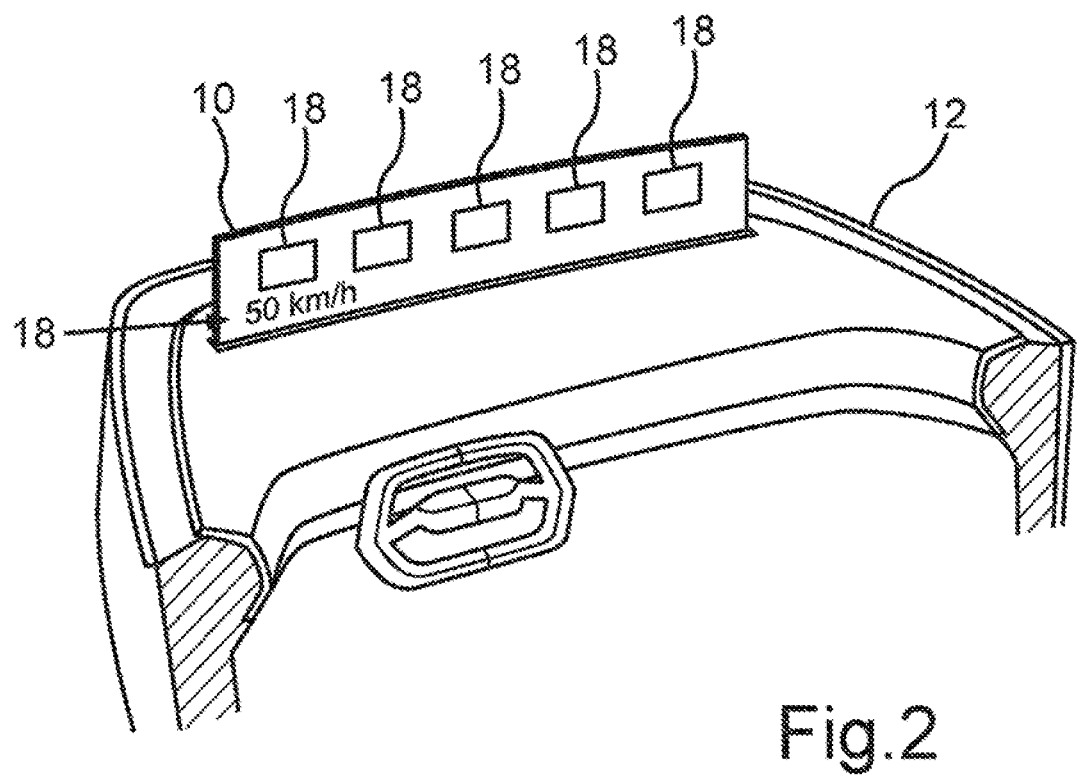
FIG. 2 is a further schematic three-dimensional representation of a motor vehicle according to an example having a display device according to an example, in a view from the inside of the motor vehicle.

FIG. 2 three-dimensionally illustrates the motor vehicle 12 in the view from a position in the interior of the motor vehicle 12 of a front side or inside of the display device 10, wherein the front side or inside can also be referred to as the "viewing side". Seen from the interior, for example, multiple display contents 18, thus, for example, multiple graphical user interfaces, can be visible. For example, a current speed can be displayed ("50 km/h"), among other things, for example.

Figure 3:
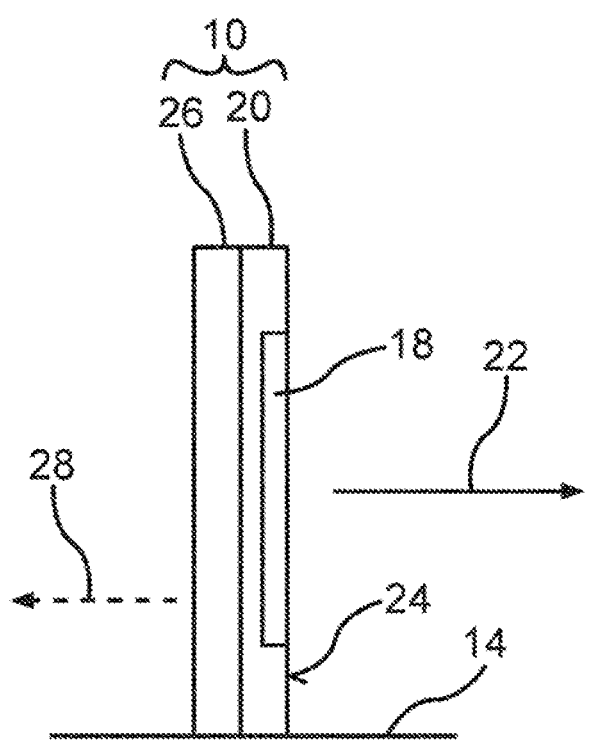
FIG. 3 is a schematic representation of a display device according to an example in cross section.

FIG. 3 schematically shows the structure of the display device 10 in cross section. The display device 10 can include, for example, a display screen made of micro-LEDs as the transparent display screen element 20. Currently, common micro-LED display screens are only available with a limited display area, because of which the transparent display screen element 20 can be a TOLED (display having transparent LEDs).

The cross section of the display device 10 in FIG. 3 illustrates that the displayed content 18 can be seen in a viewing direction 22—thus, for example, from an occupant when transferred to the example of FIG. 1, and in FIG. 2, for example—on a front side 24 of the transparent display screen element 20. In the example, the front side 24 of the display screen element 20 can also correspond to the front side (or inside or viewing side) of the display device 10.

A polarizing element 26 may be arranged flatly on a rear side of the display screen element 20 opposite to the front side 24, for example, adhesively bonded, laminated, or fastened in another manner. The polarizing element 26 has a polarizing action, i.e., the polarizing element 26 can have a polarizing effect, on the light of the display screen element 20 which is actively emitted by lighting elements (not shown in the figures) of the display screen element 20. In other words, the polarizing element 26 can itself polarize light actively emitted by the display screen element 20, thus optionally can be a polarizer; or the polarizing element 26 can attenuate or even completely block the light actively emitted by the display screen element 20 in another way, so that the display content 18 is not visible on the rear side of the display device 10 and thus to a person who looks at the rear side of the display device 10. However, the person on the rear side of the display device 10 can still see through the display screen element 20. In FIG. 3, the blocking direction 28 is shown for illustration, thus that direction in which the displayed content 18 cannot be seen, thus in which the light of the display screen element 20 is attenuated, blocked, or filtered away.

The polarizing element 26 can be, for example, a switchable film, which can be in a transparent state to function like a polarizer and "filters away" the displayed content 18. In an example, the polarizing element 26 can then include, for example, a switchable layer, for example, as a TSD layer, SPLC layer ("intelligent glass", "smart glass"), or PDLC layer.

One of the following examples of the polarizing element 26 is described. The effect of attenuating or even blocking the light of the lighting elements of the display screen element 20, for example, light of LEDs or OLEDs, or transparent OLEDs, with uniform or nearly uniform transparency seen from both sides of the display device 10 is multiple times stronger upon the use of a polarizing element 26 which is designed as a twisted nematic display element or as a vertical alignment element, or includes such a display element. In an example, the transparent display screen element 20 can be for the purpose of only outputting non-polarized light. The polarizing element 26 can be a masking element and/or "smart glass".

Figure 4:
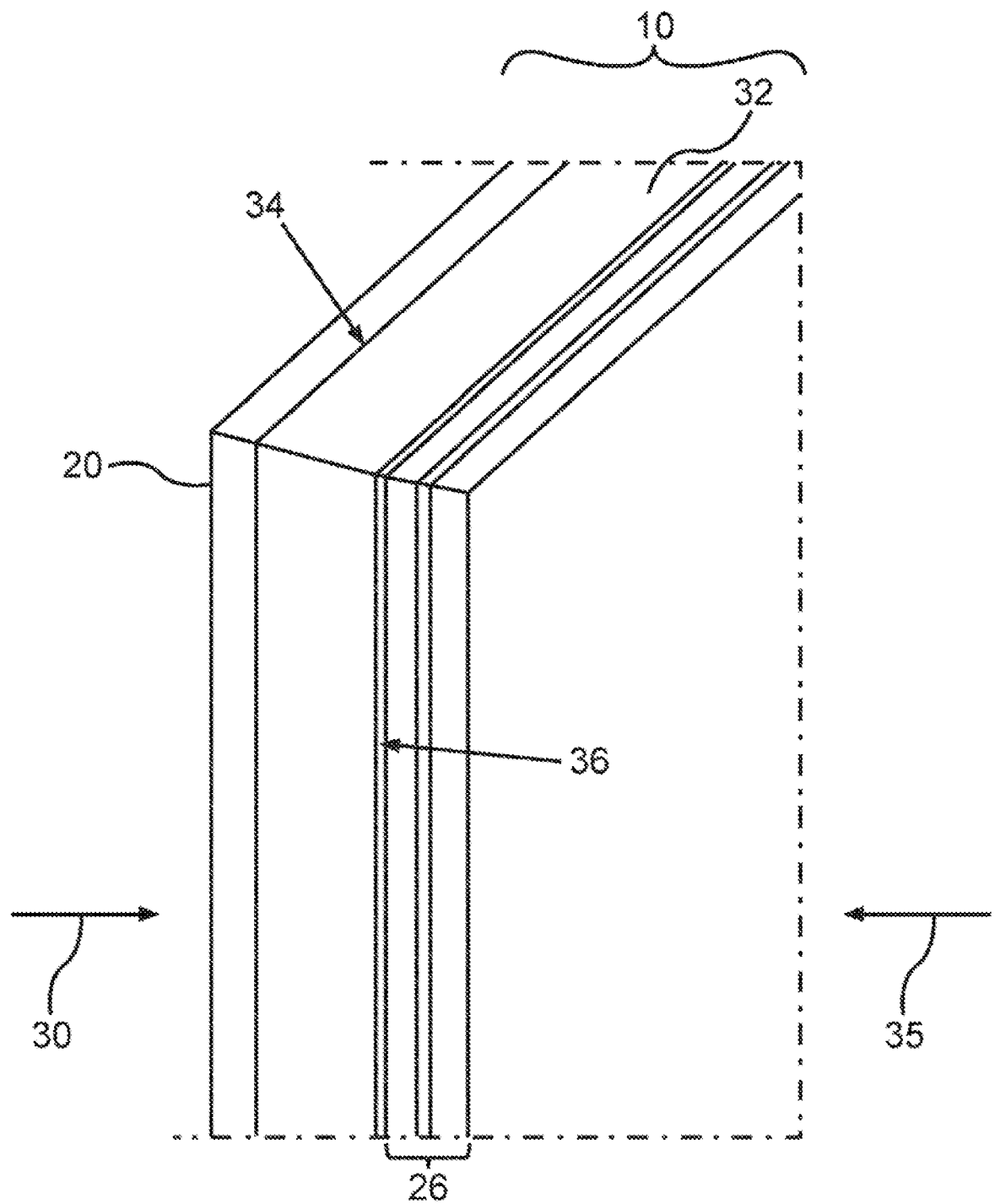
FIG. 4 is a schematic three-dimensional representation of a display device according to an example.

FIG. 4 shows such an example, in which the display device 10 can be display screen element 20, for example, as an OLED display screen, or as a transparent OLED display screen. The light-emitting diodes can output non-polarized light here. The arrow 30 points in the direction here in which a visible image is located, thus at the front side 24 of the display screen element 20. The transparent display screen element 20 can optionally be arranged from the rear side of the transparent display screen element 20 on a carrier glass 32, which can be, for example, 5 mm thick and can consist of glass. The reference sign 34 indicates the point at which the rear side of the transparent display screen element 20 is arranged on the carrier glass 32, for example, in direct contact on the carrier glass 32, thus without connecting layer.

The carrier glass 32 can be arranged on the polarizing element 26 via a connecting layer 36 which is, for example, 0.2 mm thick. The connecting layer 36 can be any connecting layer known to a person skilled in the art from the related art, for example, an adhesive layer or a lamination. Displayed content 18 is then also not visible in the viewing direction 35 when the transparent display screen element 20 outputs the displayed content 18.

In the example of FIG. 4, the polarizing element 26, as already discussed above, can be a twisted nematic display element, for example, a twisted nematic display screen; or a vertical alignment display element, for example, a vertical alignment display screen. Such display screens generally have multiple internal layers which are indicated in FIG. 4. The polarizing element 26 can optionally have two display elements, for example, a twisted nematic display screen and a vertical alignment display screen. For this variant, FIG. 4 can indicate the plurality of display elements of the polarizing element 26.

The transparent display screen element 20 can include a reflection protection element (not shown separately in FIG. 4) on the front side 24, which can include, for example, a film composite made of a linear polarizer film and a quarter-wave film for reducing a reflection of the incident ambient light on the display screen element 20. The ambient light incident from the interior of the motor vehicle 12 is delayed by the reflection protection element in the phase, for example, by 45° and at the same time converted into circularly polarized light having, for example, left-hand polarization, which can extend in parallel and perpendicularly to the optical axis. This circularly polarized light can be converted back into a right-circular polarization and blocked by the front reflection protection element to increase a contrast.

The left-hand circularly polarized ambient light which radiates through the display screen element 20 can then be "decircularized" or linearized again at a reflection protection element arranged on the rear side of the display screen element 20 as a further reflection protection element, so that the further rear reflection protection element can be, for example, a part of the display screen element 20 or of the polarizing element 26.

The polarizing element 26, for example, a twisted nematic display element and/or a vertical alignment display element, on the carrier glass 32 can have antiparallel grating structures. These can then, for example, at a boundary layer, have a linearly polarizing effect on the light of the lighting elements, for example, by way of the further reflection protection element. The image of the lighting elements is strongly attenuated if the linear polarization structure is normal to the grating direction. An intensity can vary depending on the angle between the linear polarization direction and the grating direction, thus can be set by the angle.

According to a further example, the polarizing element 26 can be a polarization filter or can have such a filter. The transparent display screen element 20 can then be for the purpose of outputting polarized light by its lighting elements. OLEDs which provide polarized light by a chemical structure to bypass a reflection filter, for example, of a mobile telephone or television, are known to a person skilled in the art from the related art. If the lighting elements of the display screen element 20, which are, for example, LEDs or organic LEDs, are for the purpose of outputting polarized light, the polarizing element 26 or components of the polarizing element 26 can be arranged rotated in accordance with the alignment of the polarized light.

Overall, the examples show how a transparent display screen element 20, for example, a T-OLED, may be provided, which is "invisible" from a rear side, through a polarizing element 26, for example, a switchable film which polarizes.

The polarizing element 26, for example, the switchable film or switchable layer by way of example, can be aligned as a polarizer, for example, so that in the transparent state the polarizing element 26 filters away the light of the exemplary T-OLED to the outside.

The emitted light can thus be blocked in the direction, for example, of the windshield by the deliberate alignment of the example film as a polarizer.

The display screen element 20 of the display device 10 thus only illuminates in the direction of the driver and the contents of the display are invisible to the outside.

The transparency of the display is thus not additionally influenced. If the display is switched to "transparent", a passerby can look through the display from the outside into the motor vehicle 12 without seeing a (lighted) display screen content. At the same time, the driver sees a (lighted) graphic or the GUI (graphical user interface) at the same position from the other side.

However, the displayed content is only visible on one side. The emission of the light is prevented or reduced on the other side (for example the rear side of the display screen element 20), while the display (thus the display screen element 20, and/or the polarizing element 26) still remains transparent in both directions.

This effect can be achieved by a polarizing element 26, for example, a second switchable layer (for example LCD), behind the actual display (O-LED).

The display device 10 has the desired property of the light emission of the display in only one direction. The display also remains transparent in both directions.

A description has been provided with particular reference to examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A display device, comprising:
   a transparent display screen element having at least one lighting element configured to output light to form a display content and which has a front side and a rear side opposite to the front side; and
   a polarizing element arranged flatly on the rear side of the transparent display screen element and configured to attenuate the light actively output by the at least one lighting element of the transparent display screen element so that the display content is not visible on the rear side of the display device.

2. The display device as claimed in claim 1, wherein the at least one lighting element is a transparent organic light-emitting diode (TOLED).

3. The display device as claimed in claim 1, wherein the polarizing element has a grating structure.

4. The display device as claimed in claim 3, further comprising at least one planar reduction protection element to reduce a reflection of ambient light from the transparent display screen element, wherein
the at least one planar reduction protection element has a polarization filter element to cause a linear polarization of the ambient light, and
the polarization filter element has a polarization structure oriented toward a grating direction of the grating structure.

5. The display device as claimed in claim 1, wherein the polarizing element is a vertical alignment display element.

6. The display device as claimed in claim 1, wherein the polarizing element is a twisted nematic display element.

7. The display device as claimed in claim 1, wherein the polarizing element is a combination of a twisted nematic display element and a vertical alignment display element.

8. The display device as claimed in claim 1, wherein the polarizing element is polarization filter-free.

9. The display device as claimed in claim 1, wherein the polarizing element includes a polarization filter.

10. The display device as claimed in claim 1, wherein the transparent display screen element is configured to output non-polarized light by the at least one lighting element.

11. The display device as claimed in claim 1, wherein the at least one lighting element is configured to output polarized light.

12. A motor vehicle having:
a display device including,
a transparent display screen element having at least one lighting element configured to output light to form a display content and which has a front side and a rear side opposite to the front side; and
a polarizing element arranged flatly on the rear side of the transparent display screen element and configured to attenuate the light actively output by the at least one lighting element of the transparent display screen element so that the display content is not visible on the rear side of the display device.

13. The motor vehicle as claimed in claim 12, wherein
the display device at least a part of a windowpane of the motor vehicle, or is freestanding at or on an interior trim element of the motor vehicle,
the front side faces towards an interior of the motor vehicle, and
the rear side faces towards a windowpane of the motor vehicle.

14. The motor vehicle as claimed in claim 13, wherein the at least one lighting element is a transparent organic light-emitting diode (TOLED).

15. The motor vehicle as claimed in claim 13, wherein the polarizing element has a grating structure.

16. The motor vehicle as claimed in claim 15, wherein
the display device further comprises at least one planar reduction protection element to reduce a reflection of ambient light from the transparent display screen element,
the at least one planar reduction protection element has a polarization filter element to cause a linear polarization of the ambient light, and
the polarization filter element has a polarization structure oriented toward a grating direction of the grating structure.

17. The motor vehicle as claimed in claim 13, wherein the polarizing element is at least one display element from among a twisted nematic display element, a vertical alignment display element, or a combination of a twisted nematic display element and a vertical alignment display element.

18. The motor vehicle as claimed in claim 13, wherein the polarizing element is at least one polarization element from among a polarization element that is polarization filter-free, or a polarization element that includes a polarization filter.

19. The motor vehicle as claimed in claim 13, wherein the transparent display screen element is to output at least one type of light from among a non-polarized light by the at least one lighting element, or a non-polarized light by the at least one lighting element.

20. The display device of claim 1, wherein the polarizing element is a switchable layer configured to be in a transparent state and to attenuate the light actively output by the at least one lighting element of the transparent display screen element.

* * * * *